Patented Dec. 7, 1926.

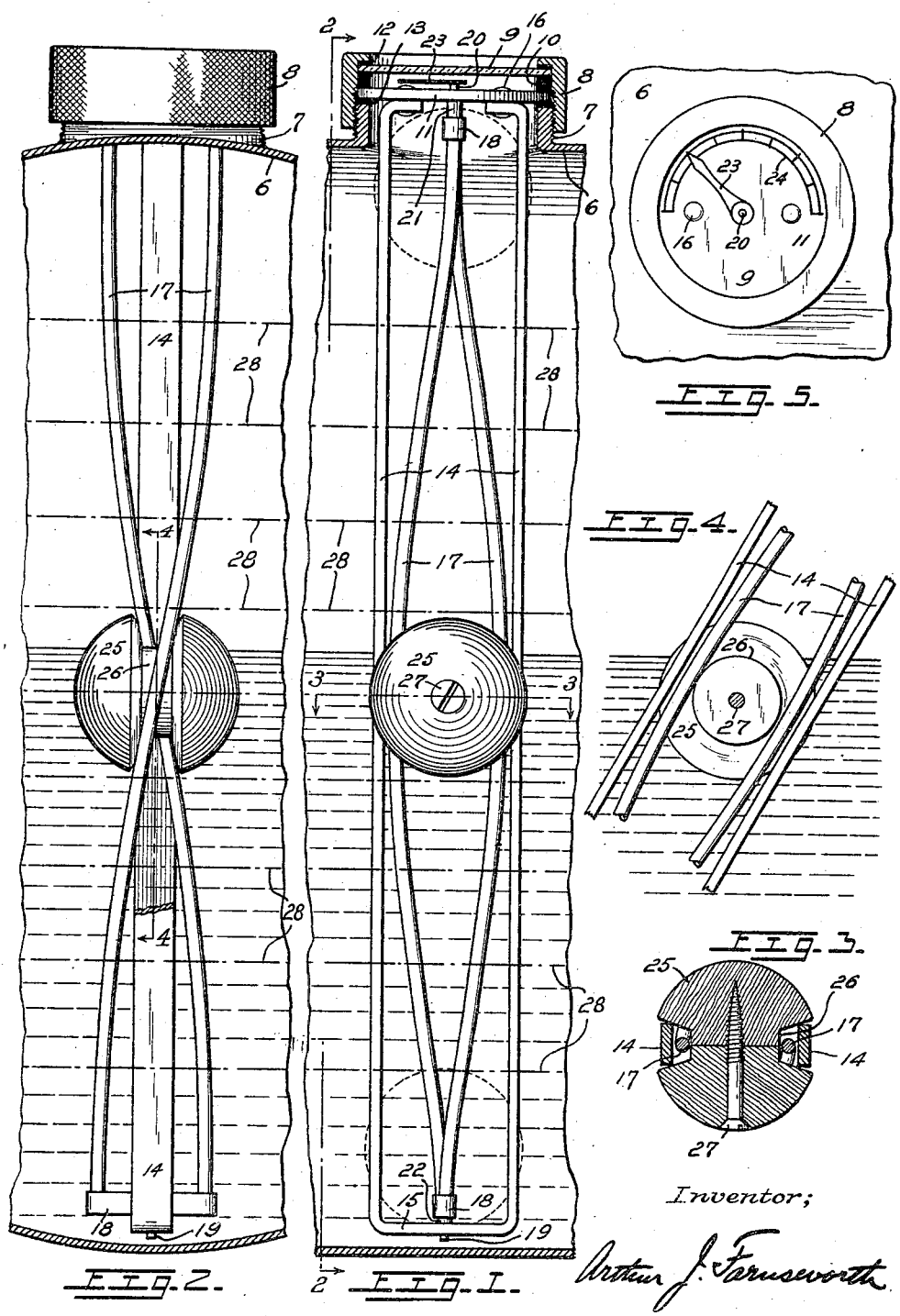

1,609,997

UNITED STATES PATENT OFFICE.

ARTHUR J. FARNSWORTH, OF PASADENA, CALIFORNIA.

FLOAT GAUGE.

Application filed March 30, 1926. Serial No. 98,520.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to float gauges adapted for indicating the volume of confined liquids by means of the depth. Its principal objects are: first, to provide a device of this nature whereby the volume of liquid may be correctly indicated on a proportional scale when the liquid is confined between sloping non-parallel walls, as in the case of a horizontally positioned cylindrical tank; second, to produce a float gauge that is not subject to damage or mal-adjustment when the liquid becomes violently agitated, as in the case of fuel in an automobile tank; third, to supply an instrument of this kind that is adapted for operation in either a vertical or inclined position; and, fourth, to accomplish the above by means of a very simple and relatively inexpensive construction.

My objects are attained in the manner indicated in the accompanying drawing, in which—

Figure 1 is a central longitudinal section of a portion of an automobile fuel tank with my improved float gauge installed therein, the view being in elevation;

Figure 2 is a cross section of the above construction taken on the line 2—2;

Figure 3 is a cross section of my device taken on the line 3—3.

Figure 4 is a fragmentary section in elevation taken on the line 4—4 and illustrating the adaptability of the invention for use in an inclined position; and Figure 5 is a plan view of the indicating portion of my gauge in relation to a tank closure.

Similar reference numerals refer to similar parts throughout the several views.

For many purposes it is customary to store liquids in horizontally positioned cylindrical tanks, as in tank cars, locomotive tenders, fuel tanks for automobiles, and motor trucks for transporting liquids. In these cases the volume of the confined liquid is not a straight line function of its depth, and a float gauge whose indications are proportional to the depth does not indicate the volume of confined liquid correctly. The above is also true in other instances where the confining walls are sloping and not parallel. My float gauge construction is adapted for correctly indicating stored liquid volumes on a proportional scale when the volume is either a straight line function or a curvilinear function of the depth.

The drawings show an application of my invention to a horizontal cylindrical fuel tank of an automobile. The tank body 6 is formed with a screwed nipple 7 at the top, and an internally flanged bezel 8 containing a cover glass 9 is screwed upon the nipple in the usual manner. Beneath the glass, and spaced from it by a packing ring 10, is the circular dial plate 11 of my float gauge. This plate is supported by the upper edge of nipple 7, and is retained in place by the flange of bezel 8 and the intervening elements. Packing ring 12 serves as a cushion between the bezel flange and glass 9, and packing ring 13 serves, as do the others, to prevent leakage of liquid due to splashing.

Depending from dial plate 11 is a rectangular frame made by bending a flat metallic bar to form parallel spaced guide bars 14 which are connected at the bottom by a transverse portion 15. This frame is attached to the dial plate by rivets 16, and it extends nearly to the bottom of tank 6. Its purpose is to furnish a support for the rotating element of the device and to supply means for guiding the float element.

The rotary element of my construction consists of a secondary frame comprising a pair of helically bent bars 17 which are uniformly spaced and maintained in fixed relation by transverse members 18 at their respective ends. This rotary elment is coaxially pivoted within the main frame of the device by means of a pivotal mounting 19 in transverse portion 15, and by a similar mounting 20 in dial plate 11. Spacing washers 21 and 22 are employed where necessary to limit longitudinal motion of the rotary element and to support its weight. Pivot 20 extends through the dial plate and has a needle 23 affixed at its upper extremity. This needle is adapted to read upon scale 24 on the dial plate and, by means of the angular position of the rotary element, to indicate the volume of fluid in tank 6 that corresponds to this angular position.

The controlling member of my gauge consists of a spherical float 25 having a deep circumferential groove therein. The bottom of this groove has a cylindrical surface 26 whereon the float may roll. In this manner it is possible to eliminate practically all of the friction that would otherwise oppose the movements of the float. For convenience in assembling the device the float is preferably made in similar halves held together by a screw 27.

The two guide bars 14 and the two helical bars 17 are engaged by the circumferential groove of the float as shown in the drawings. Consequently the rotary element of the device comprising the helical bars is constrained to turn as the float moves up and down guided by bars 14. There is no resistance opposing the turning of the rotary element except the very small amount of friction at pivots 19 and 20, and this is entirely negligible in practice for the reason that the pivots are kept lubricated by the splash of the liquid in the tank and by immersion therein. Consequently only a slight float buoyancy is required and the float may be relatively very small.

It has already been indicated that bars 17 are helically bent. The rotary element is preferably made by fixing straight parallel bars in transverse members 18 and then twisting this assembled member on a mandrel in such a manner that the bars will take on a helical form, of constant or varying pitch as desired to meet the service conditions of the gauge. Thus, for use in a parallel-sided tank, where the volume of confined liquid is directly proportional to the depth of the liquid, the pitch of helical bars 17 would be uniform. If the gauge is to be used in a horizontally postioned cylindrical tank where the volume of confined liquid is not directly proportional to its depth, the helical bars 17 may be given a form having a constantly varying pitch in order that a proportional scale may be employed at 24.

In Figs. 1 and 2 of the drawings the cross sectional area of tank 6 is divided by lines 28 into 2 segments and 8 zones having equal areas. The pitch of the helical bars 17 constantly varies and, at each point, corresponds to the horizontal distance between the adjacent division planes represented by lines 28. Consequently a relatively small vertical movement of float 25 in its central position will produce a relatively great angular displacement of the rotary element, and the vertical movements of the float at all positions will cause needle 23 to indicate corresponding liquid volumes correctly on a proportional scale at 24. If the helical pitch of bars 17 were constant it would be necessary, in the case of horizontally placed cylindrical tanks, to make use of a non-proportional scale at 24.

In automobile fuel tanks, and many other cases, it is frequently desirable to make use of a float gauge in an inclined position as shown in the fragmentary view of Fig. 4. My invention is peculiarly adapted to such uses by reason of its cylindrical guiding surface 26. The use of this cylindrical guiding surface permits the float to roll upon the elements by which it is confined, instead of being required to slide thereon. Consequently friction is reduced to a minimum and sticking or cramping of the float element is practically eliminated. A consideration of Fig. 4 will clearly indicate the functioning of my float gauge when used in an inclined position.

I particularly desire to point out that my improved float gauge is not at all likely to be damaged by the action of a violently agitated liquid, such as gasoline in an automobile tank. The moving parts are very closely confined laterally and are not subject to lateral displacement by wave action. Rapidly occurring variations in the depth of liquid due to wave action do not produce violent fluctuations in the moving parts of the instrument on account of the inertia of float 25. Finally I desire to call attention to the great simplicity of my device, the fewness of its parts, the small space that it requires, and its relative cheapness.

Having thus fully described my invention I claim:

1. A device of the character described comprising; parallel spaced guide bars; a rotatable member having uniformly spaced helical bars, longitudinally positioned between the guide bars; and a float member between the helical bars having spaced opposed surfaces engaging the helical bars and guide bars in such manner that an angular movement may be imparted to the rotatable member by longitudinal movement of the float.

2. A device of the character described comprising; parallel spaced guide bars; a rotatable member having uniformly spaced helical bars of continuously varying pitch, longitudinally positioned between the guide bars; and a rotatable float member between the helical bars having spaced opposed walls engaging the helical bars and guide bars in such manner that angular movements of equal increments may be imparted to the rotatable member by longitudinal movements of unequal increments of the float.

3. A device of the character described comprising; parallel spaced guide bars; a rotatable member having uniformly spaced helical bars longitudinally positioned between the guide bars, and a spherical float between the helical bars having a circumferential groove the lateral walls of which engage the guide bars and the helical bars in such a manner that an angular movement may be imparted to the rotatable member by a longitudinal movement of the float.

4. A device of the character described comprising; a circular plate having a concentric graduated dial upon its upper surface; a pair of parallel spaced guide bars depending from said plate equidistant from its center, and connected by a cross member at their lower ends; a rotatable member, having a pair of uniformly spaced helical bars connected together by transverse members at their respective ends, pivoted centrally in said plate and in said cross member; and a spherical float between the helical bars having a deep circumferential groove the lateral walls of which engage the guide bars and the helical bars in such a manner that an angular movement may be imparted to the rotatable member by a longitudinal movement of the float; the upper pivot of the rotatable member being extended through the dial plate and being provided with a needle at its upper end whereby the angular position of the rotatable member may be indicated upon said dial.

5. A device of the character described comprising; a circular plate having a concentric uniformly graduated dial upon its upper surface; a pair of parallel spaced guide bars depending from said plate equidistant from its center, and connected by a cross member at their lower ends; a rotatable member, having a pair of uniformly spaced helical bars connected together by transverse members at their respective ends, pivoted centrally in said plate and in said cross member; and a spherical rotatable float between the helical bars having a deep circumferential groove the lateral walls of which engage the guide bars and the helical bars in such a manner that an angular movement may be imparted to the rotatable member by a longitudinal movement of the float; the upper pivot of the rotatable member being extended through the dial plate and being provided with a needle at its upper end adapted to read upon said dial proportionally to angular displacements of the rotatable member; and the pitch of said helical bars being continuously varied in such manner that longitudinal displacements of the float by liquid in a tank of variable horizontal section will cause an angular movement of the rotatable member proportionate to changes in the volume of confined liquid.

ARTHUR J. FARNSWORTH.